April 26, 1938.                C. D. RYDER                2,115,590
                              MOLDING MACHINE
                          Filed Feb. 8, 1936           6 Sheets-Sheet 1
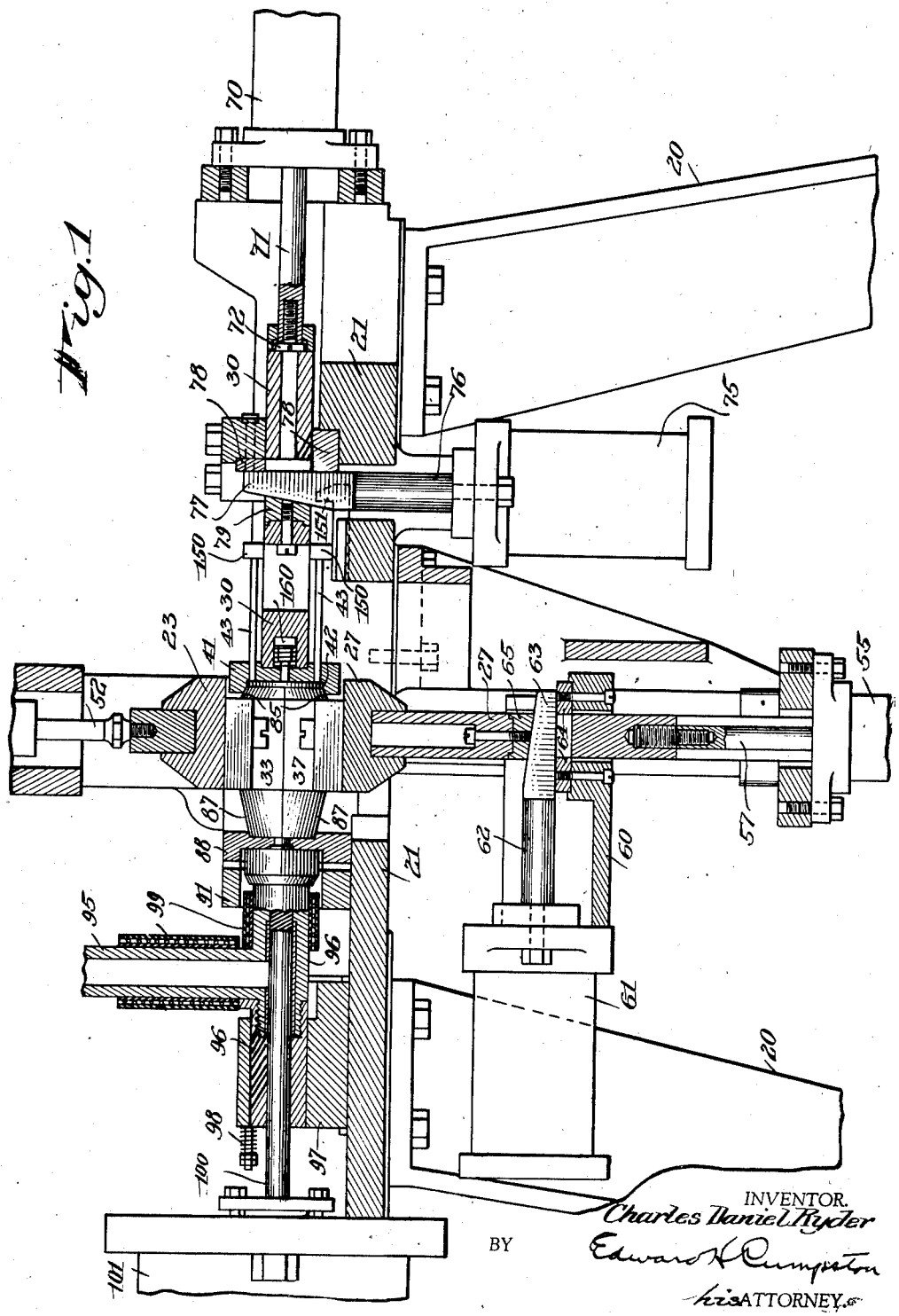
INVENTOR.
Charles Daniel Ryder
BY Edward H. Cumpston
his ATTORNEY.

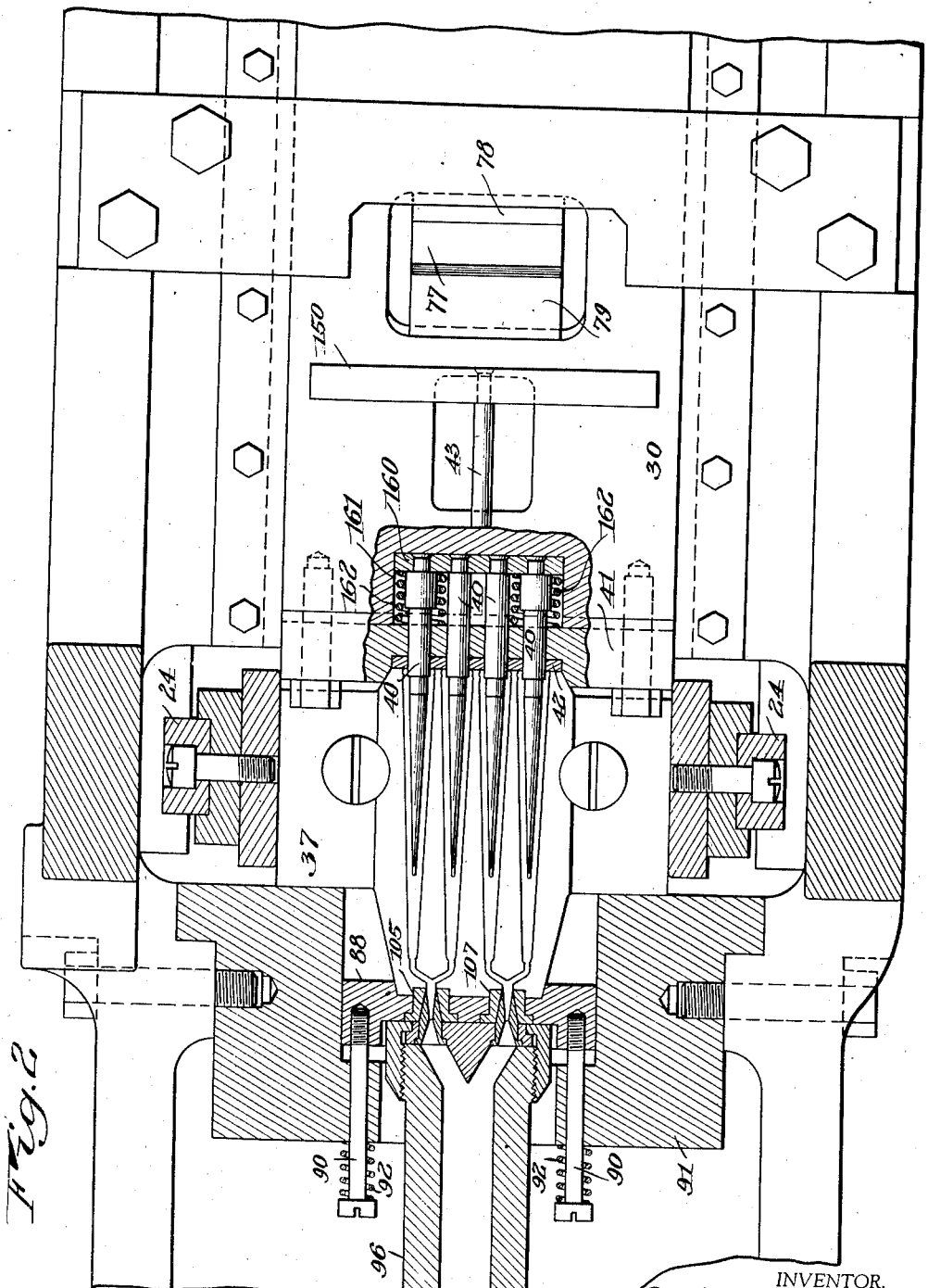

April 26, 1938.　　　　C. D. RYDER　　　　2,115,590
MOLDING MACHINE
Filed Feb. 8, 1936　　　　6 Sheets-Sheet 3
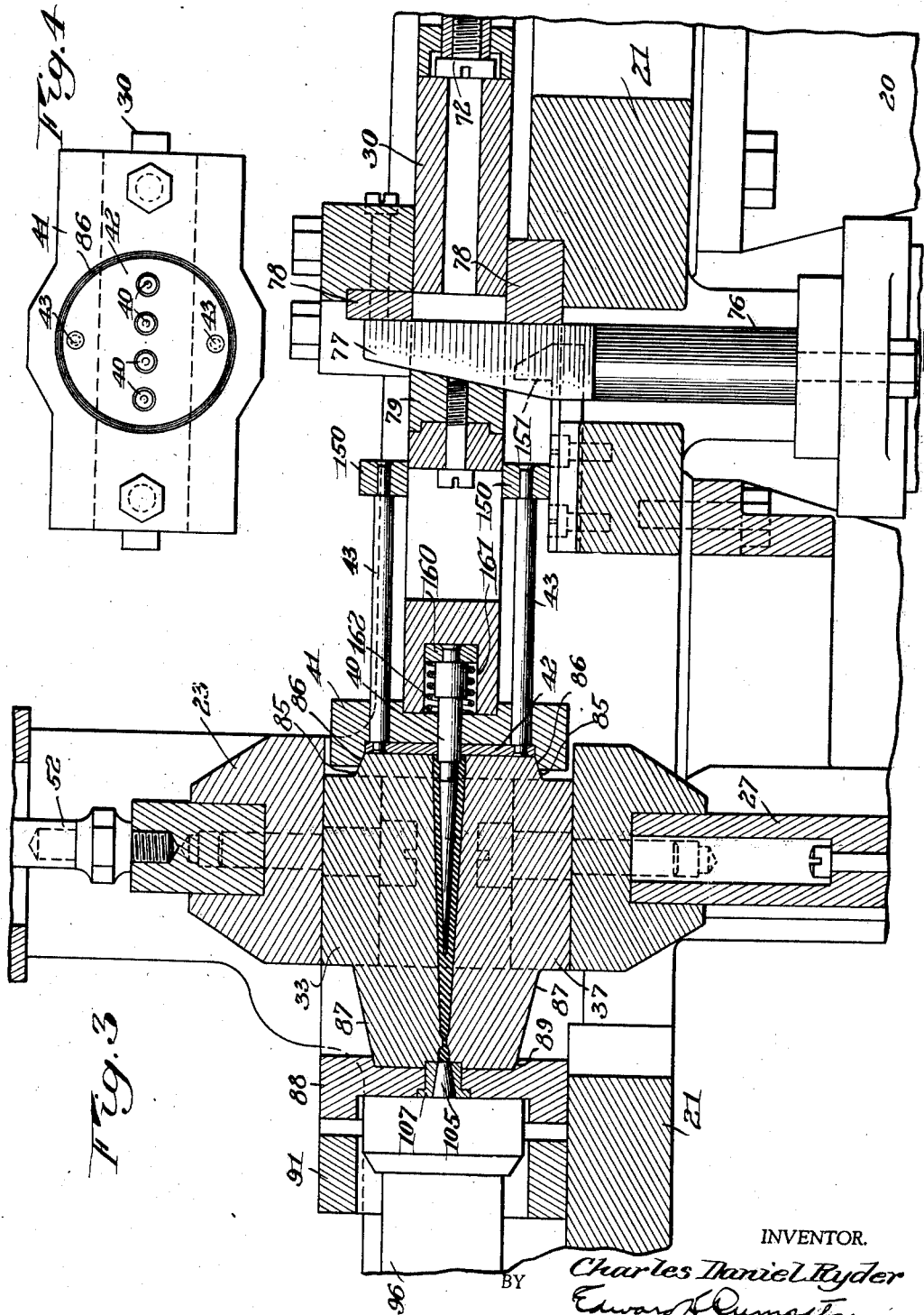

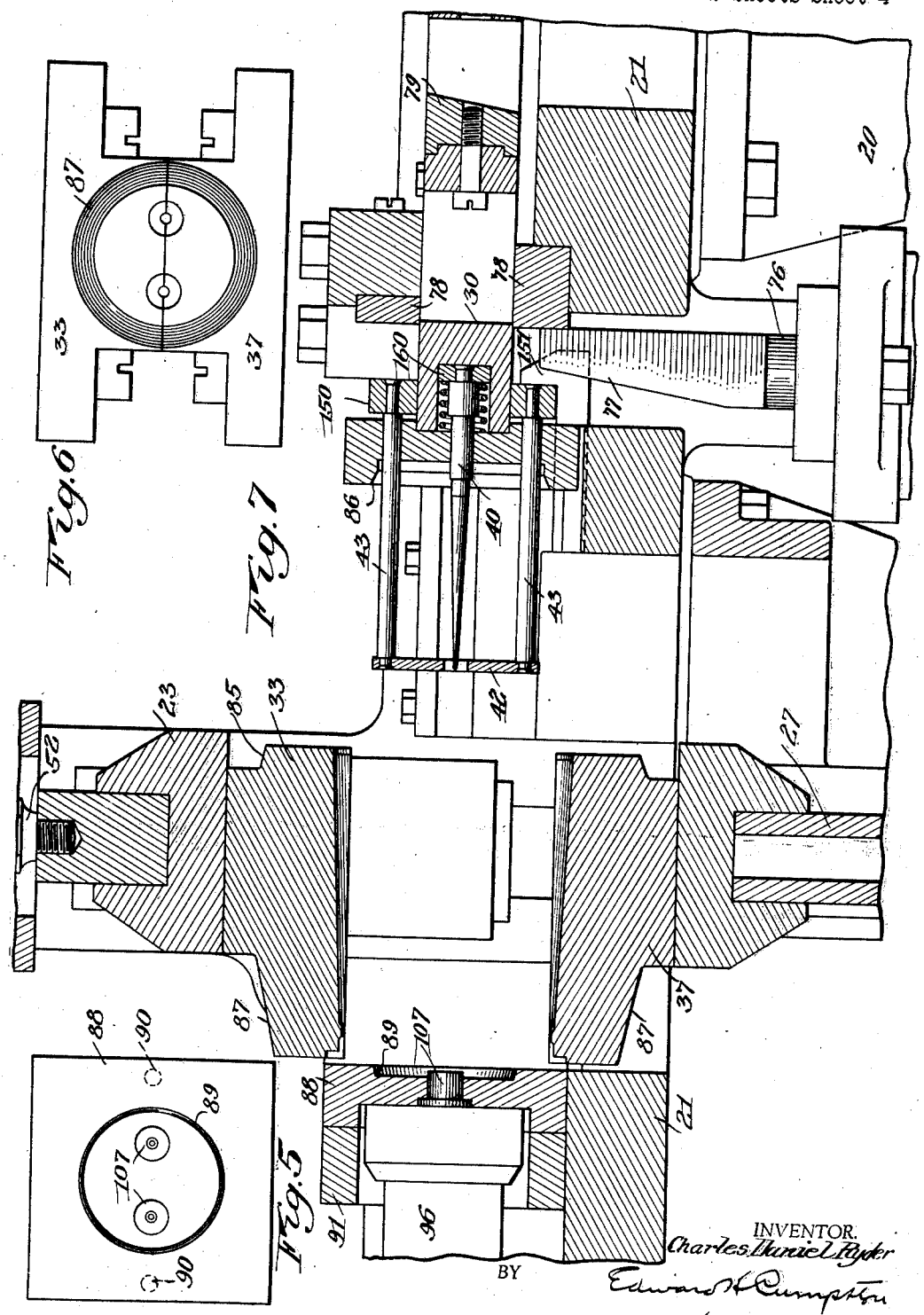

April 26, 1938.  C. D. RYDER  2,115,590
MOLDING MACHINE
Filed Feb. 8, 1936  6 Sheets-Sheet 5
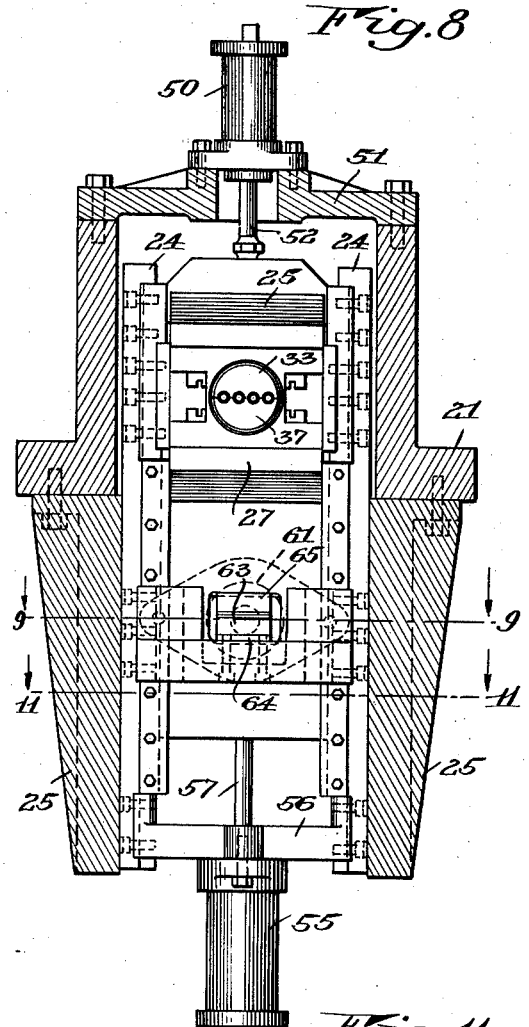
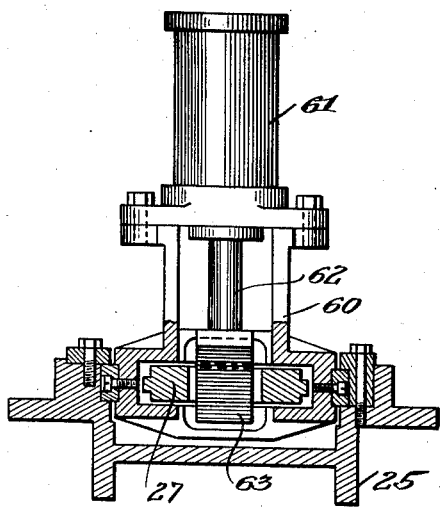
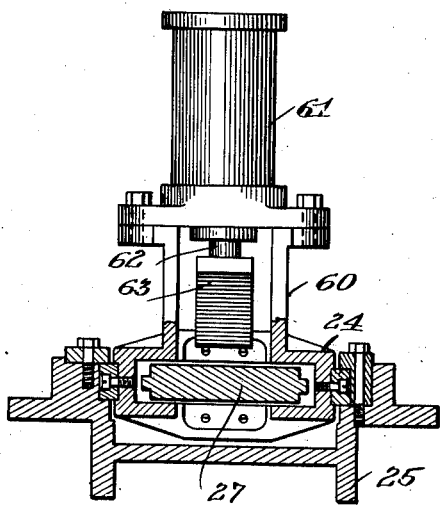
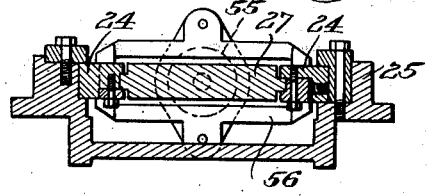
INVENTOR.
Charles Daniel Ryder
BY Edward H Cumpston
his ATTORNEY.

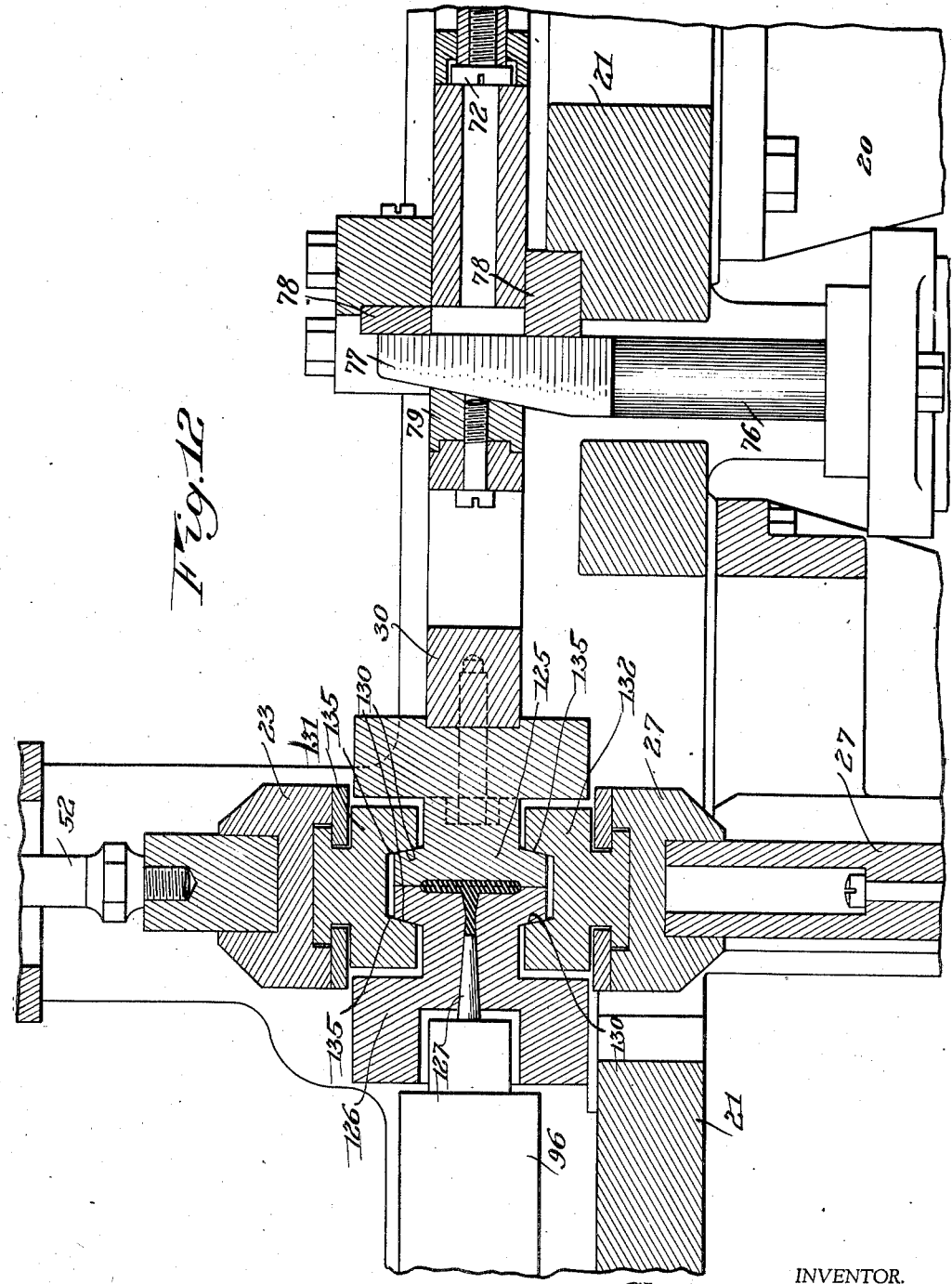

Patented Apr. 26, 1938

2,115,590

UNITED STATES PATENT OFFICE 2,115,590

MOLDING MACHINE

Charles Daniel Ryder, Covington, Ky., assignor to The Grotelite Company, Bellevue, Ky., a corporation of Kentucky Application February 8, 1936, Serial No. 62,922

13 Claims. (Cl. 18—30)

This invention relates to a molding machine, and has for one of its objects the provision of a generally improved and more satisfactory machine of this kind.

Another object is the provision of a molding machine having improved means, of simple and efficient character, for locking the mold in closed position, and particularly the provision of locking means capable of withstanding relatively great molding pressures within the mold.

A further object is the provision of mold locking means particularly adapted to a machine having a plurality of different movements or slides for moving different mold parts, and so arranged that when one or more of the movements are not needed for operating mold parts, they may be utilized for operating the mold locking means.

To these and other ends the invention resides in certain improvements and combinations of parts, all as will be hereinafter more fully described, the novel features being pointed out in the claims at the end of the specification.

In the drawings:

Fig. 1 is a view partly in side elevation and partly in vertical section, with parts broken away, of a molding machine embodying a preferred form of the present invention;

Fig. 2 is a view partly in plan and partly in horizontal section of some of the mechanism shown in Fig. 1;

Fig. 3 is a longitudinal vertical section taken centrally through the mold and associated parts, showing the mold in closed and locked position;

Fig. 4 is an elevational view of one mold locking member, showing also the mold cores and stripping plate;

Fig. 5 is a similar view of the other mold locking member, showing also the orifices through which the molding material is injected into the mold;

Fig. 6 is an end elevational view of the injection end of the mold in closed position;

Fig. 7 is a view similar to Fig. 3 showing the mold unlocked and in open position;

Fig. 8 is an elevational view of part of the mold opening and closing mechanism, with the part in closed position and with associated parts of the frame in vertical section;

Fig. 9 is a horizontal section taken substantially on the line 9—9 of Fig. 8, with the parts in the position assumed when the mold is closed;

Fig. 10 is a view similar to Fig. 9, showing the parts in the position assumed when the mold is open;

Fig. 11 is a horizontal section taken substantially on the line 11—11 of Fig. 8, and Fig. 12 is a view similar to Fig. 3 showing a modified form of construction.

The same reference numerals throughout the several views indicate the same parts.

Referring now to the form of the invention illustrated by way of example in Figs. 1 to 11, inclusive, there is shown a molding machine having legs 20 supporting a main frame or bed plate 21 on which are mounted a plurality of slides, one of which is preferably movable in a direction substantially perpendicular to another. These slides may include, for example, an upper vertically movable slide member 23 secured to slide members 24 (Fig. 8) which slide vertically in guideways in brackets 25 secured to the main frame 21. The slides may also include a lower vertically movable slide 27 movable on guideways formed on the inner faces of the members 24 which are secured to the upper slide 23, this construction being plainly illustrated in Figs. 8 to 11, inclusive. There may also be a horizontal slide member 30.

Suitable means, such as fluid pressure means, may be employed for operating the various slides as desired, and the various slides are used for holding and operating the usual mold parts, the mold core, locking members, and the like, according to the design of the mold and of the particular article or articles being molded. For example, in the embodiment here illustrated, the upper slide 23 may carry an upper mold part 33, while the lower slide 27 carries a lower mold part 37, and the slide 30 carries the cores 40, the locking member 41, and the stripping plate 42 mounted on rods 43 slidable longitudinally through holes in the locking member 41 which is rigidly secured to the slide 30.

The operating mechanism for the slides may include, as shown in Fig. 8, a fluid pressure cylinder 50 supported on a bracket 51 fixed to the main frame 21 and having a piston rod 52 secured to the upper slide 23. The lower part of the cylinder 50, below the piston therein, may be kept filled with fluid which, however, is permitted to escape to a reservoir when the pressure exceeds a certain amount, so that the fluid will constantly tend to move the piston upwardly to the top of the cylinder, but the piston may be pulled downwardly whenever a superior force is exerted in a downward direction.

A second fluid pressure cylinder 55 may be mounted on a cross bar 56 secured to the slide members 24 near their lower ends, and the piston rod 57 of this cylinder may be connected to the lower slide 27. If fluid be introduced into the lower part of this cylinder 55, below the piston therein, the fluid pressure will exert an upward force on the piston and piston rod, and a downward force on the lower cylinder head. The upward force on the piston will move the slide 27 upwardly until the mold part 37 mounted on this slide comes into contact with a suitable fixed stop, not shown. Then, since the slide 27 cannot move any further upwardly, the reaction of the fluid against the lower cylinder head of the cylinder 55 will move the whole cylinder downwardly, overcoming the lesser force exerted by the cylinder 50, and pulling downwardly on the slide members 24 and the upper slide 23 until the upper mold part 33 is moved down to closed position in contact with a fixed stop (not shown) or with the lower mold part 37, depending on the design of the particular mold being used at this time.

If so desired, wedging means may be employed to assist the fluid pressure within the cylinders in holding the mold in closed position. For example, a bracket 60 (Fig. 1) secured to and movable bodily with the slide members 24 may carry a fluid pressure cylinder 61 having a piston rod 62 connected to and operating a wedge 63 movable horizontally into a small space between reaction blocks 64 fixed to the members 24 and the wedging surface 65 on the lower slide 27. As will be readily apparent from Fig. 1, rightward movement of the wedge 63 will tend to force the slide 27 upwardly and the slide parts 23 and 24 downwardly, thus tightly closing the mold and holding it closed.

The horizontal slide 30 may be likewise operated by fluid pressure means such as the cylinder 70 having a piston rod 71 connected to the slide member 30 by a connection 72 preferably having a little lost motion or play therein. As the mold parts 33 and 37 are being closed, or after they have been closed, the fluid pressure cylinder 70 is operated to move the slide 30 in a leftward direction when viewed as in Fig. 1, so that the cores 40 are moved into proper position in the mold. If desired, wedging means similar to the wedge 63 may be employed for locking this slide also. A fluid pressure cylinder 75 secured to a fixed part of the frame has a piston rod 76 carrying a wedge 77 movable into the space between reaction blocks 78 on the fixed bed 21 and an inclined wedging block 79 on the slide 30. After the cylinder 70 has moved the slide 30 as far as possible in a leftward direction, the operation of the wedge 77 by the cylinder 75 drives the slide 30 firmly home and may, if desired, even give it an additional substantial increment of motion, due to the loose connection 72.

It is apparent that the three slides 23, 27, and 30 may be used for mounting any desired mold parts. Thus the machine is particularly flexible, and may be used with molds opening in a single direction or with more complicated molds opening in two or more directions. According to the present invention, one or another of the slides is also employed for operating additional mold clamping or locking means, especially useful when great molding pressures are necessary or when the mold is so shaped that the pressure of the molding material tends to separate the mold parts with great force.

When the mold is one which opens at a substantially horizontal parting line, as here shown, the horizontal slide 30 may be conveniently employed for operating this additional clamping means. For example, the right hand ends of the mold parts 33 and 37 may be beveled off or formed with inclined faces 85 on their upper and lower surfaces, and preferably also all the way around the mold parts, so that the inclined surfaces 85 may be preferably, but not necessarily, of frusto-conical form. The above mentioned clamping member 41 secured to the slide 30 has inclined surfaces 86 for embracing and contacting with the inclined surfaces 85 on the mold members, as best shown in Fig. 3. This clamping member 86 may be described as being substantially U-shaped in cross section as seen in Figs. 3 and 7, and it is apparent that when the clamping member is moved leftwardly with relation to the mold members, the inclined clamping surfaces 86 at the top and bottom of the clamping member will react upon the inclined surfaces 85 at the top and bottom of the mold members and act as wedges to embrace and grip the mold members and wedge them tightly toward each other. When the inclined surface 85 is not only at the tops and bottoms of the mold members but is extended frusto-conically around the mold members, the surface 86 on the clamping member 41 is preferably of similar complemental frusto-conical shape to contact with and fit against the surface 85 not only at the top and bottom, but also all around the sides. When this construction is employed, the clamping member 41 will not only wedge the two mold members tightly against each other in a vertical direction, but will also serve to center them accurately with respect to each other in a horizontal direction, shifting one or the other of the mold members slightly laterally or transversely to aline it properly with the other, if they are not already in proper alinement when the clamping member 41 is brought up against the mold parts.

A similar clamping arrangement may be used at the opposite end or left hand end of the mold. Here, as seen in Figs. 3 and 7, the upper and lower mold parts 33 and 37 are made with inclined faces 87, preferably also of frusto-conical shape, and they are engaged by and alined and clamped together by a clamping member 88 having inclined clamping surfaces 89 complemental to and engaging the surfaces 87 on the mold parts.

The clamping member 88 is slightly movable horizontally to engage it in clamping relation with or disengage it from the inclined clamping surfaces 87 of the mold parts. As shown in Fig. 2, studs 90 may be fixed to the clamping member 88 and may extend leftwardly through suitable openings in a stationary member 91 fixed to the main frame 21 of the machine. These studs 90 are surrounded by coiled compression springs 92 which constantly tend to move the clamping member 88 leftwardly to a disengaged position, but which will yield under the influence of a superior force when the clamping member 88 is moved rightwardly to a clamping position by any suitable mechanism.

The mechanism for moving the clamping member 88 may conveniently be the same mechanism which injects the molding material into the closed mold. For instance, referring especially to Fig. 1, there may be a vertical cylinder 95 for receiving and holding molding material, and leading into a horizontal cylinder 96, the two cylinders together being bodily movable horizontally to a slight extent through bearings in a fixed member 97. Spring means 98 constantly urges the cylinders leftwardly. Electric heating means 99, controllable as desired, surrounds suitable parts of the cylinders 95 and 96 to heat the powder or other molding material within the cylinders to bring such material to the proper temperture and plasticity for molding. An injection ram 100 is movable through the cylinder 96 and is operated by suitable means such as the fluid pressure cylinder 101.

When the fluid pressure cylinder is operated to move the ram 100 in a rightward direction when viewed as in Fig. 1, the resistance offered by the molding material within the cylinder 96 causes the whole cylinder to move bodily rightwardly with the ram until one or more injection nozzles 105 fixed to the front or right hand end of the cylinder 96 are firmly seated in injection openings, which may be formed in bushings 107 extending through the clamping member 88. When the nozzles are thus seated in the bushings, the clamping member 88 is then picked up and carried along rightwardly, compressing the springs 92, until further movement of the clamping member is stopped by firm contact of this member with the mold parts. Then, since the cylinder 96 and the clamping member 88 cannot move further rightwardly, the continued movement of the ram 100 within the cylinder 96 forces a portion of the molding material therein out through the nozzle or nozzles 105 and into the mold, to make whatever molded article this particular mold is designed to make. In the embodiment here shown, the mold is designed for making fountain pen tips for desk sets, but this particular form of mold is illustrated only as a convenient example, as the present invention is not dependent upon the particular article being molded.

When other forms of articles are to be molded, it may be necessary to arrange the mold parts somewhat differently, but the principles of this invention with respect to clamping the mold firmly in closed position may still be employed. For example, for molding some articles, the mold must open or break along a plane substantially perpendicular to the direction of injection, rather than along a plane substantially in or parallel to the direction of injection, as in the embodiment above described. When such opening in a direction perpendicular to the direction of injection is required, the arrangement shown in Fig. 12 may be employed, in which the horizontal slide 30 is used to carry one of the mold parts instead of the clamping member, and in which the vertical slides 23 and 27 are used to carry the clamping parts.

As plainly shown somewhat diagrammatically in Fig. 12, the mold may include a part 126 mounted on the slide 30 to be moved by this slide to and from open and closed positions. In its closed position, the left hand face of the mold, carrying recesses for receiving molding material to form articles, lies in contact with the right hand face of the other mold part 126, which, in this instance, may be stationary. The nozzle or nozzles 127 on the injection cylinder 96 are forced, upon rightward movement of the injection cylinder, into suitable nozzle orifices in the mold part 127, and then are retracted from these orifices after each molding operation is completed upon subsequent leftward movement of the cylinder 96.

Both mold parts 125 and 126 carry inclined faces 130 on each of two opposite sides of the mold, in this instance, the top side and the bottom side. Clamping members 131 and 132, the former attached to the upper slide 23 and the latter attached to the lower slide 27, are of generally U-shaped construction when viewed in cross section as in Fig. 12, and have inclined faces 135 for cooperation with the inclined faces 130 on the mold parts, to embrace the mold parts and act as wedges to force them tightly together and hold them firmly in clamped position. Thus the clamping members 131 and 132 assist the wedge 77 in holding the mold closed, and enable the mold to withstand relatively great molding pressures without breaking the parts.

As in the previous embodiment, the inclined faces 130 on the mold parts may be simply flat faces or may be of frusto-conical shape, the latter being preferred because in that event the cooperating complementary clamping members serve to aline the mold parts laterally relative to each other as well as to clamp the parts firmly to each other.

It is now seen that simple and effective clamping mechanism has been provided, in addition to the wedges 63 and 77, for holding the mold parts in closed position. It is also seen that the machine is particularly flexible, as it may be easily changed from one type of mold (such as shown in Figs. 1 to 11) to another type of mold (such as shown in Fig. 12) without changing any of the other parts of the machine except the mold parts and the locking members, and the timing mechanism for operating the various fluid pressure cylinders in proper timed sequence to each other. Yet the machine is not confined in its usefulness to molds of the character herein disclosed, since it may also be used with three part molds rather than two part molds, one part being mounted on each of the slides 23, 27, and 30, and the U-shaped clamping members being omitted if necessary. In that event, reliance may be had upon the wedges 63 and 77 for locking the mold in closed position, and this will, of course, be taken into consideration when designing the mold, so that the internal pressures in the mold will not exceed those which can be safely resisted by the wedges 63 and 77.

While the operation of most of the parts has been disclosed in connection with the description of the individual parts, it is thought that a brief summary of the operation of the machine as a whole may be helpful at this point. Referring to the embodiment illustrated in Figs. 1 to 11, inclusive, and assuming that a previous molding operation has been finished and the molded article has been ejected and that the mold is in open position as shown in Fig. 7, the first step in the next molding operation is the closing of the mold. This is accomplished by operating the fluid pressure cylinder 55 to move its piston rod 57 upwardly to bring the lower mold part or section 37 up into contact with a suitable fixed stop. Continued operation of the cylinder 55 then pulls the upper mold part 33 downwardly, against the resistance of the cylinder 50, and into contact with the lower mold part 37 or with a suitable fixed stop, so that the mold is closed. The fluid pressure cylinder 61 is then operated to actuate the wedge 63 to lock the mold in closed position, and concomitantly therewith, or just prior to the actuation of the cylinder 61 if preferred, the fluid pressure cylinder 70 is actuated to move its piston rod 71 leftwardly, thus carrying the slide 30 leftwardly and introducing the cores 40 into proper position within the mold. The fluid pressure cylinder 75 is operated to move the locking wedge 77 into position. The last part of the movement of the slide 30, either caused by the cylinder 70 or by the wedge 77, moves the clamping member 41 firmly over projections or lugs at the right hand end of the mold parts 33 and 37, contacting with the inclined faces of those projections or lugs, and acting as what might be termed an external wedge to wedge the projection or lug on one mold part firmly toward the projection or lug on the other mold part, thus holding the mold tightly closed.

Molding material having previously been introduced into the cylinders 95 and 96 and brought to the proper temperature by the heating means 99, the fluid pressure cylinder 101 is now actuated to move the ram 100 in a rightward direction. During this rightward movement of the ram 100, it moves the entire cylinder 96 in a rightward direction, bringing the injection nozzle or nozzles 105 into the injection orifices in the member 88, and moving the entire clamping member 88 in a rightward direction from the position shown in Fig. 7 to the position shown in Fig. 3, so that this clamping member 88, like the clamping member 41, engages the inclined faces on the lugs or projections on the left hand end of the mold parts 33 and 37 and firmly clamps the mold together at this end. Further actuation of the ram 100 extrudes the molding material from the chamber within the cylinder 96 out through the nozzles 105, and into the mold.

The pressure within the cylinder 101 is then reversed to retract the ram 100, which retracts the cylinder 96 and permits the spring 92 to pull the clamping member 88 back from its embracing position with respect to the mold. The cylinder 75 is then actuated to release the wedge 77, the cylinder 61 is actuated to release the wedge 63, and, approximately simultaneously, the cylinder 70 retracts the slide 30 enough to release the clamping member 41 from the mold parts, and the cylinder 55 lowers the lower mold part 37 and permits the upper mold part 33 to rise under the influence of the constant pressure within the cylinder 50, thus opening the mold. Further rightward movement of the slide 30 draws the cores 40 completely out of the mold, and as they are drawn back fully, a cross bar 150 attached to the rods 43 which carry the stripping plate 42 strikes against a suitable lug or projection 151, prevents the stripping plate from moving further rightwardly with the slide 30, and causes the cores 40 to be pulled rightwardly through the now stationary stripping plate, so that the molded articles will strip from the cores 40 and fall down into a suitable receptacle. The molding cycle is now completed and the machine is ready for the next molding operation.

When a mold part is placed on the slide 30 instead of on the slides 23 and 27, and when the clamping members are placed on the slides 23 and 27, as in the embodiment shown in Fig. 12, the operation of the machine is the same except that the cylinder 70 is first actuated to move the slide 30 to close the mold, and then afterwards the cylinder 55 is actuated to move the clamping members down onto the top side and up onto the bottom side of the mold.

The fluid pressure cylinders may, of course, be operated by either liquid or gas. Gas in the form of compressed air, has been found in actual practice to be particularly suitable for actuating these parts, but under some circumstances it may be preferred to use water, oil, or other liquid.

Instead of affixing the core members rigidly to the slide 30, they may, if desired, be secured to a bar 160 movable within a recess 161 within the slide 30 and constantly urged by springs 162 in a rightward direction so that the part 160 normally lies flat against the right hand side of its recess 161, but it may move slightly leftwardly upon compression of the springs 162.

The present invention may be considered in some respects as an improvement upon and modification of the invention disclosed in the copending United States patent application of Harold L. Jeffery, Serial No. 603,377, filed April 5, 1932, for Molding machine and method, and many features disclosed but not claimed in this present application are claimed in said Jeffery application.

One satisfactory form of timing and operating mechanism for operating the various fluid pressure cylinders in proper sequence, and other details of construction and operation not necessary to an understanding of the present invention, are disclosed in Canadian Patent No. 340,046, granted March 13, 1934, for an invention of Harold L. Jeffery.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. An injection molding machine comprising two mold parts movable relatively to each other in one direction to open and close the mold, fluid pressure means for causing relative movement of said mold parts, said mold parts having portions with surfaces converging toward each other in a direction transverse to said direction of movement of said mold parts, means for engaging said converging surfaces on the two mold parts to clamp said two parts firmly together, other fluid pressure means for operating said engaging means, and mechanism for injecting the material to be molded after said mold parts have been closed and clamped together.

2. An injection molding machine comprising a mold including two parts one of which is movable toward and away from the other to close and open the mold, fluid pressure cylinder means operatively connected to said one of said mold parts to move it, projections on said two mold parts, a member having opposed inclined surfaces for embracing and cooperating with said projections, other fluid pressure cylinder means for moving said member to and from clamping engagement with said projections to assist in holding said two mold parts in closed position and to release them for opening movement, and mechanism for injecting the material to be molded after said mold parts have been closed and clamped together.

3. An injection molding machine comprising separable mold parts, means for effecting relative movement of said parts to open and close the mold, a projection on each of two opposite sides of one of said mold parts, a projection on each of two opposite sides of the other of said mold parts, two members on opposite sides of said mold parts each having a recess and inclined converging faces at two opposite sides of said recess, said two converging faces on one of said members being adapted to embrace and make wedging contact with one of said projections on one of said mold parts and one of said projections on the other of said mold parts, said two converging faces on the other of said members being adapted to embrace and make wedging contact with the other two projections on the opposite sides of said two mold parts, means for moving said two members from positions disengaged from said projections to positions tightly engaged with their respective projections to exert a force on two opposite sides of said mold parts tending to clamp said mold parts together, and mechanism for injecting the molding material after said mold parts have been closed and clamped together.

4. An injection molding machine comprising separable mold parts, fluid pressure means for moving one of said mold parts in a direction toward and away from the other to close and open the mold, a projection on each of two opposite sides of one of said mold parts, a projection on each of two opposite sides of the other of said mold parts, two members on opposite sides of said mold parts each having a recess and inclined converging faces at two opposite sides of said recess, said two converging faces on one of said members being adapted to embrace and make wedging contact with one of said projections on one of said mold parts and one of said projections on the other of said mold parts, said two converging faces on the other of said members being adapted to embrace and make wedging contact with the other two projections on the opposite sides of said two mold parts, second fluid pressure means operating in a direction substantially perpendicular to the direction of movement of said first mentioned fluid pressure means for moving said two members from positions disengaged from said projections to positions tightly engaged with their respective projections to exert a force on two opposite sides of said mold parts tending to clamp said mold parts together, and mechanism for injecting the molding material after said mold parts have been closed and clamped together.

5. An injection molding machine comprising a mold including two parts separable from each other along a parting line, means for moving one of said mold parts toward and away from the other of said parts, each mold part including a shoulder with an inclined face on each of two opposite sides of each mold part, each such shoulder on one mold part being substantially opposite one of the shoulders on the other mold part, two clamping members on opposite sides of said mold parts, each of said clamping members including a generally U-shaped portion straddling said parting line and having inclined faces for cooperation with the inclined faces on one shoulder of one of said mold parts and a corresponding shoulder of the other of said mold parts to tend to wedge said two shoulders toward each other, means for moving said clamping members from an ineffective position to an effective position to clamp said two mold parts tightly to each other, and mechanism for injecting molding material after said mold parts have been closed and clamped together.

6. An injection molding machine comprising a mold including two parts separable from each other for opening the mold, operating means for moving one of said mold parts longitudinally toward and away from the other of said parts when closing and opening the mold, wedge means for locking said operating means in closed position and thereby holding the mold closed, shoulder means projecting laterally from each of said two mold parts, clamping means having sliding wedging engagement with shoulder means on both of said mold parts for clamping and additionally holding said mold parts in closed position, and mechanism for injecting molding material under pressure after said mold parts are closed and clamped together.

7. An injection molding machine comprising a mold having a plurality of separable parts having inclined faces for cooperating with inclined faces of clamping members therefor, operating means movable longitudinally in one direction, second operating means movable longitudinally in a different direction substantially perpendicular to the direction of movement of the first mentioned operating means, one of said mold parts being operatively connected to and movable with one of said operating means to close the mold, a clamping member operatively connected to and movable with the other of said operating means, said clamping member having inclined faces for engaging the inclined faces of the mold parts to force them toward each other when closed, and mechanism for injecting the molding material after the mold parts are closed and clamped together.

8. An injection molding machine comprising a mold having a plurality of separable parts having inclined faces, operating means movable longitudinally in one direction, second operating means movable longitudinally in a different direction substantially perpendicular to the direction of movement of the first mentioned operating means, one of said mold parts being operatively connected to and movable with one of said operating means to close the mold, a clamping member operatively connected to and movable with the other of said operating means, said clamping member having two opposed inclined faces for engaging the inclined faces of the mold parts to force them toward each other when closed, and mechanism for injecting the molding material after said mold parts are closed and clamped together.

9. An injection molding machine adapted for molding articles in molds opening in a single direction and also in molds opening in two different directions at an angle to each other, comprising a first mold section having a filling orifice therein, a first slide member, a second mold section mounted on said first slide member for movement therewith into and out of cooperative relationship to said first mold section, a fluid pressure means for operating said slide member, each of said two mold sections having a lateral projection on one side thereof, a second slide member mounted for movement in a direction toward and away from said mold sections and generally transverse to the direction of movement of said first slide member, a second fluid pressure means for operating said second slide member, a clamping member mounted on said second slide member and having spaced wedging surfaces for engaging said lateral projections on said two mold sections to clamp said two mold sections together, said clamping member being removable from said second slide member so that a third mold section may be mounted on said second slide member to be moved thereby into and out of cooperation with the other mold sections when a mold opening in two directions is required, and means for discharging molding material through said orifice into the mold when the mold is closed.

10. In a molding machine, the combination of a mold comprising separable mold parts having tapered end portions, means for moving the mold parts together, means having cooperating tapered faces for engaging with the tapered end portions of the mold parts to clamp the ends of the mold parts together, and means for injecting molding material into the said mold.

11. In a molding machine, the combination of a mold comprising separable mold parts having tapered end portions, means for moving the mold parts together, means having cooperating tapered faces for engaging with the tapered end portions of the mold parts to clamp the ends of the mold parts together, means for yieldingly moving said mold parts together and holding them in clamping engagement so that they are adjusted and held together yieldingly, and means for injecting molding material into the said mold.

12. In a molding machine, the combination of a mold comprising separable mold parts having tapered end portions, means for moving the mold parts together, means having cooperating tapered faces for engaging with the tapered end portions of the mold parts to clamp the ends of the mold parts together, means for yieldingly moving said mold parts together and holding them in clamping engagement so that they are adjusted and held together yieldingly, means adapted to mechanically lock said mold parts together after they have been yieldingly adjusted and engaged, and means for injecting molding material into the said mold.

13. In a plastic extrusion machine, the combination of a mold comprising separable mold parts having inclined external faces, clamping members having cooperating internal inclined faces, means for yieldingly forcing said clamping members on said mold parts to clamp the mold parts together by the yielding wedging engagement thus effected, and means for injecting molding material into the said mold while the mold parts are held in clamping engagement with each other by said clamping members.

CHARLES DANIEL RYDER.